J. W. FORD.
ATTACHMENT FOR HORSESHOES.
APPLICATION FILED MAY 22, 1914.
1,120,921.
Patented Dec. 15, 1914.
2 SHEETS—SHEET 1.
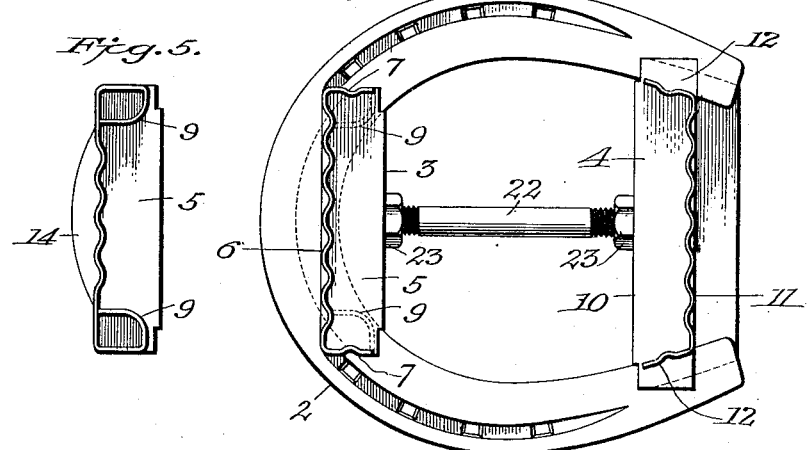
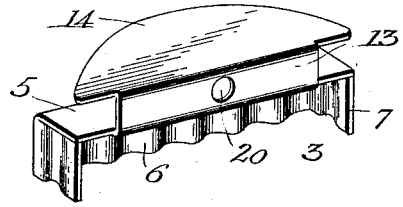
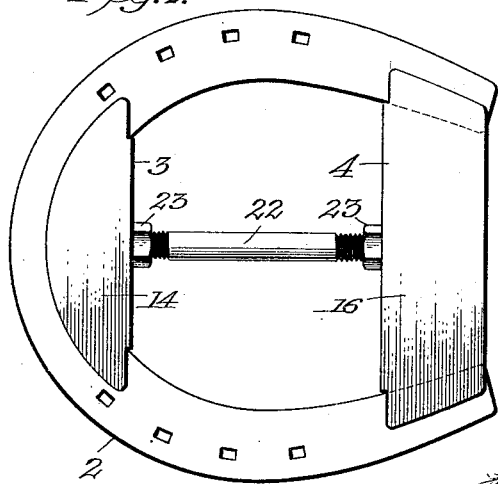
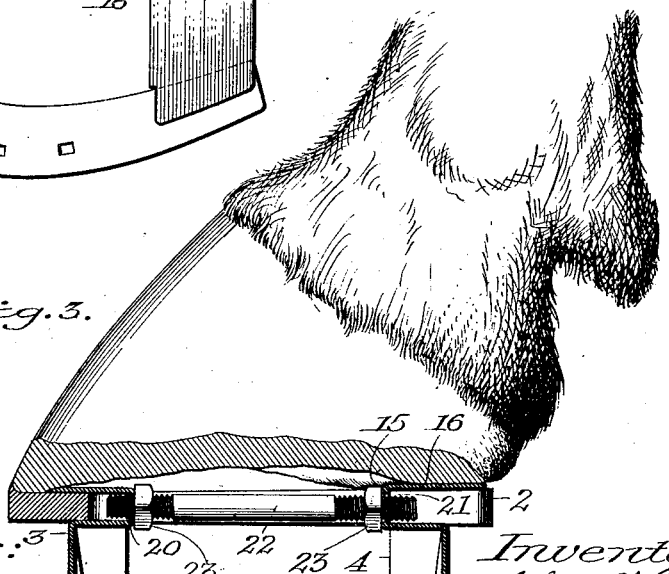
Witnesses:
G. Sarguel Elliott.
Elizabeth Smith
Inventor:
John W. Ford.
By H. S. Bailey Attorney J. W. FORD.
ATTACHMENT FOR HORSESHOES.
APPLICATION FILED MAY 22, 1914.
1,120,921.
Patented Dec. 15, 1914.
2 SHEETS—SHEET 2.
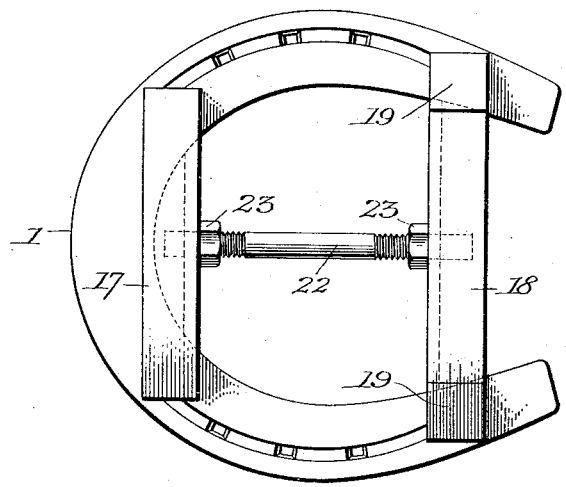
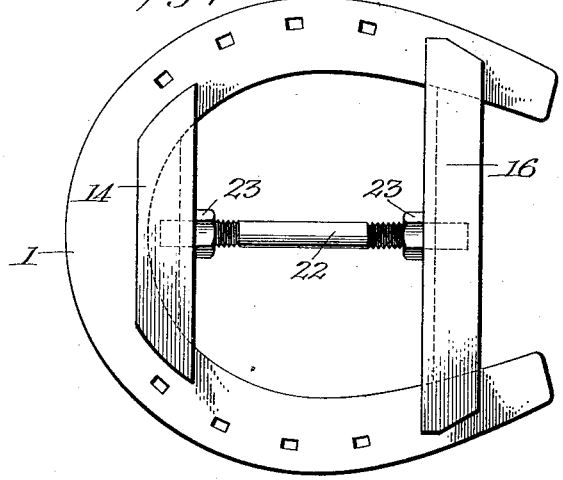
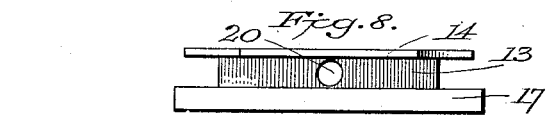
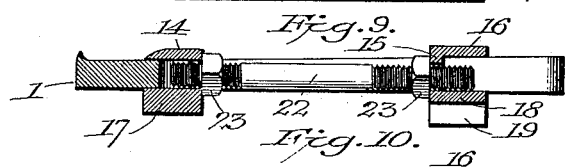
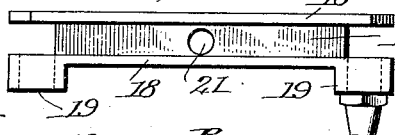
Witnesses:
G. Sargent Elliott
Elizabeth Smith
Inventor:
John W. Ford
By
H. S. Bailey Attorney.

UNITED STATES PATENT OFFICE.

JOHN W. FORD, OF DENVER, COLORADO, ASSIGNOR OF ONE-FOURTH TO JEREMIAH H. McCARTHY, OF DENVER, COLORADO.

ATTACHMENT FOR HORSESHOES.

1,120,921.    Specification of Letters Patent.    Patented Dec. 15, 1914.

Application filed May 22, 1914. Serial No. 840,274.

*To all whom it may concern:*

Be it known that I, JOHN W. FORD, a citizen of the United States of America, residing at the city and county of Denver and State of Colorado, have invented a new and useful Attachment for Horseshoes, of which the following is a specification.

My invention relates to improvements in horse shoes; and the objects of my invention are: First, to provide attachable and renewable tread members for horse shoes that are provided with toe and heel calks especially adapted for winter use. Second, to provide an attachable and renewable tread member for horse shoes, in which the tread portions are without toe and heel calks, but which can be provided with separate attachable and renewable horse shoe calks especially adapted for summer use. Third, to provide attachable and renewable tread members for horse shoes, that will prevent slipping on icy roads, and to provide tread members especially adapted for summer wear, that can be applied to shoes already on the hoofs of horses. And fourth, to provide attachable tread members for horse shoes, that allows the frog member of a horse's foot to bear with a cushioning pressure against my attachable and renewable heel members of horse shoes for horses' feet.

I attain these objects by the mechanism illustrated in the accompanying drawings, in which:

Figure 1, is a bottom plan view of a horse shoe equipped with my improved winter tread members. Fig. 2, is a top plan view thereof. Fig. 3, is a longitudinal, vertical sectional view of a shoe thus equipped, the same being shown attached to the hoof of a horse. Fig. 4, is a perspective view of the toe tread member. Fig. 5, is a bottom plan view, showing a slight modification in the arrangement of the toe tread member. Fig. 6, is a bottom plan view of a shoe equipped with summer tread members. Fig. 7, is a top plan view thereof. Fig. 8, is a side view of the toe tread member for summer wear. Fig. 9, is a vertical, longitudinal sectional view of a shoe equipped with the summer tread members. And Fig. 10, is a side view of the summer wear heel tread member.

Similar letters of reference refer to similar parts throughout the several views.

Referring to the drawings,—the numeral 1 designates a flat calkless summer horse shoe, and 2 designates a winter shoe having toe and heel calks. These two types of shoes are illustrated in order to show the application of my improved attachable and detachable and renewable summer and winter toe and heel tread members to them, and to show that my improved tread members can be applied to shoes already on horses' hoofs without removing the shoes from the hoofs, as well as being made up with new shoes.

The numerals 3 and 4 designate winter toe and heel calk members that are made to be attachable to either flat old horse shoes that are on horses' hoofs, or applied to new shoes, or that are attachable to shoes on which the toe and heel calks are either wholly or partially worn away. My two tread members for winter use comprise bar portions adapted to extend transversely across the toe and heel portions of horse shoes, and these cross bar portions can be made of any desired suitable form. I preferably, however, make these cross bar tread portions of substantially right angled form, with one wing 5 of the right angle bar portion resting flat against the tread surface of the horse shoe, and the other wing 6 arranged throughout the length of the bar at right angles to the wing 5, and depending vertically downward from it. The opposite ends of the vertically depending wing portions 5 of each winter tread member, are bent and continued around at substantially right angles to the depending portion, and in the same vertical plane, and form inclosed corner end portions 7, that establish at these opposite corners reinforced corner end calk portions, and if desired these opposite end portions can be carried around in the form of a complete loop portion 9, as shown in Fig. 5, and in dotted lines in Fig. 1. These depending rounded and opposite end portions form exceptionally substantial end calk portions, while the depending cross bar portion extending transversely across the toe end of the shoe, forms the central toe calk portion of my attachable toe calk member, and it, as well as the ends, is preferably corrugated to increase its strength.

My improved attachable toe calk tread member is made to rest against the flat tread surface of the shoe, and to extend well across the curved toe portion of the shoe, so as to allow the depending toe calk center portion and the opposite end calk portions to rest firmly on the flat portion of the shoe which receives the pressure of the weight of the horse on it. The attachable heel calk tread member 10 is made similar to the toe calk tread member in regard to the central calk portion 11, and the opposite end calk portions 12, and it is preferably made in a right angular shaped angle iron cross bar form, the same as the toe calk member, and it is arranged to lap over onto the flat tread surface of the shoe, like the toe tread member. Consequently they both have a firm substantial bearing on the tread side of the shoe.

My attachable and renewable toe and heel calk tread members are secured to the horse shoe in such a manner that their shoe attaching and clamping bearings are against the inner curved edges of the shoe, and both the toe calk and the heel calk tread members are each provided with angular extension members 13 and 14 of the toe calk tread, and 15 and 16 of the heel calk tread, which members extend from the flat plates 5 and 10 of the tread members down past the inner edge of the inner rim of the shoe, and the members 14 and 16 are then bent at right angles toward the opposite ends of the shoe, and are made to lap over onto the shoe along its inner marginal edge. Consequently when in place it clears the outer narrow rim edge surface that bears against the outside marginal edge of a horse's hoof. The plates 13 and 14, and 15 and 16, I term the shoe housing plates, inasmuch as they bear on both sides of and the inner rim edge of the shoe. The outer edge of the housing plate 14 of the toe calk member, is extended in a curved terminal edge, substantially concentric with the curved toe end of the shoe, and it extends to but does not lap over onto the hoof engaging rim portion of the shoe. This construction allows my improved attachable and renewable toe and heel calks to very firmly incase the adjacent edges and sides of the shoe.

My improved summer wear horse shoe tread members are exactly similar in construction as to the shoe housing members 13 and 14 and 15 and 16, to the winter tread members, but in regard to the action of the ground tread portions of these summer shoes, they are made slightly different and form a slight modification of the preferred construction for winter use. The toe tread member for the summer shoe comprises a flat straight thick solid cross bar 17, which is preferably smooth throughout its whole length upon its tread surface. This member can, however, if desired, be provided with attachable and renewable calks, which, as is well known, are manufactured and for sale by dealers of this class of goods, and are readily available to all users of horse shoes. The heel tread member 18 of the summer shoe, comprises a light thin flat cross bar, upon the opposite ends of which there are square raised calk members 19, which are also smooth upon their tread surfaces; these also may be provided if desired with renewable and attachable calks.

My improved toe and heel calk members for winter and summer use, are secured to the horse shoe by any suitable pressure device or mechanism, that will press and hold each or both tightly against the narrowing curved surface of the inner edge of the shoe, and my invention contemplates the use of any device for this purpose. I preferably, however, carry out this feature of my invention in the following manner: In the center of the vertical brace bars 13 and 15 of the toe and heel members of my improved horse shoe tread members, I form apertures 20 and 21, and extend between both the summer set and also the winter set of tread members, a rod or bolt 22, the opposite ends of which are threaded and extend loosely into the apertures 20 and 21. Nuts 23 are mounted on the threaded ends of the rods, which after the ends of the rod are inserted in the apertures of the brace bar portions of each tread member, are turned up against each brace plate portion and are tightened to force the tread members apart, tightly against the inner curved edge of the horse shoe, and this is the only part of the horse shoe where forcible clamping pressure is used to secure my improved attachable horse shoe tread members to horse shoes already on horses' hoofs, as well as on new shoes before they are put on My invention provides thoroughly practical attachable tread members for horse shoes, that can be applied to either new shoes or to shoes already on horses' hoofs, that are partially or wholly worn out, as far as their calk portions are concerned. And it also provides strong, durable, cheaply constructed members that can be furnished to the trade cheaply and can be applied quickly by any one without removing the shoes that are on the horses' hoofs, or loosening them in any way. And while I have illustrated and described the preferred construction and arrangement of these members for winter and summer uses, I do not wish to be limited to the construction and arrangement shown, as many changes might be made without departing from the spirit of my invention.

Having described my invention, what I claim as new and desire to secure by Letters Patent, is:

1. The combination with a horse shoe, of renewable tread pieces therefor, consisting of toe and heel members, each comprising transverse parallel plates and connecting end walls of less length than the plates, said plates engaging the upper and lower sides of the shoe while the ends of the end walls engage the inner edges of the shoe adjacent its respective ends, a bolt having threaded ends which extend through apertures in said end walls, nuts on said threaded ends which are screwed against the said end walls thereby to jam the ends of said walls between and against the edges of the shoe, and depending calk members on the lower plates of each tread piece, said toe calk member being arranged to extend transversely across and bear removably on the solid toe portion of the shoe, and said heel calk being arranged to extend across the open space between the ends of the heel portion of the shoe.

2. The combination with a horse shoe, of renewable tread pieces therefor, consisting of toe and heel members, each comprising parallel, transverse, horizontal plates and connecting abutment walls, said walls being of less length than the parallel plates, and engaging the inner edges of the shoe adjacent its ends, while the parallel plates engage the upper and lower sides thereof, corrugated calk strips which extend the length of the lower plates of the tread pieces and terminate in right angled end portions, a bolt having threaded ends which extend loosely through central apertures in the said abutment walls, and nuts on said threaded ends, which are screwed against the said abutment walls thereby to jam the ends of said walls against the inner edges of the shoe.

In testimony whereof I affix my signature in presence of two witnesses.

JOHN W. FORD.

Witnesses:
JOHN SMITH,
ELIZABETH SMITH.

Copies of this patent may be obtained for five cents each, by addressing the "Commissioner of Patents, Washington, D. C."